Figure 1:
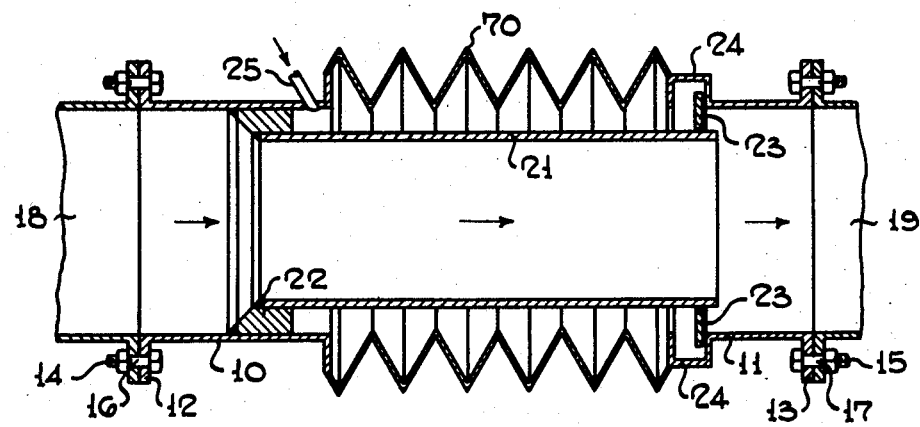

May 2, 1950      E. COPELAND      2,506,293
EXPANSION JOINT

Filed Dec. 26, 1946      2 Sheets-Sheet 1

Ernest Copeland    Inventor
By J.C. Small   Attorney

May 2, 1950     E. COPELAND     2,506,293
EXPANSION JOINT

Filed Dec. 26, 1946     2 Sheets-Sheet 2

Ernest Copeland Inventor
By J K Small Attorney

Patented May 2, 1950

2,506,293

UNITED STATES PATENT OFFICE 2,506,293

EXPANSION JOINT

Ernest Copeland, Elizabeth, N. J., assignor to Standard Oil Development Company, a corporation of Delaware Application December 26, 1946, Serial No. 718,469

4 Claims. (Cl. 285—90)

This invention relates to flexible pipe joints, and particularly to bellows type joints.

In heat engineering and petroleum refinery engineering, expansion joint development has become an important feature of engineering design. In petroleum refining, for example, large size expansion joints are employed in connection with cracking operations. In catalytic cracking, a factor of considerable importance is the handling of fluidized solids and the prevention of the finely divided solids from entering into the expansible element thus preventing free movement essential to safe pipe-line operation. In the prior art, sleeve or cartridge elements have been employed to protect the bellows element. The prevention of infiltration of erosive or corrosive material between the sleeve and bellows element has been proposed by packing one or both ends of the sleeve or by purging the bellows element with a stream of inert gas or vapor. The device of the present invention is a further development in this field.

It is an object, therefore, of the present invention to provide a flexible pipe joint adapted to absorb longitudinal, lateral and misalignment changes as may occur in piping systems. Another object of the invention is to provide an expansion joint with a flexible sealing member and an additional attachment which substantially prevents infiltration of the fluid being transported through the joint into the expansible member and also aids in the production of streamlined flow through the joint. A further object of the invention is to furnish for known bellows type joints a sleeve or cartridge element which substantially eliminates contact of the fluid being transported with the bellows element and in addition contributes to streamlined flow of the fluid through the joint. A further object of the invention is to furnish bellows type joints with a flexible protecting element which minimizes defects of fabrication especially as to warping and out of roundness particularly of the sleeve. Other objects of the invention will be apparent from the following description and illustration of the invention.

Circular bellows or corrugated expansible elements protected by a sleeve or cartridge element have been employed in the prior art. This liner element serves both to reduce wear on the expansible element and also to aid in maintaining streamlined flow of the material through the piping system and especially through the expansible joint connection. In most of these cases, however, the expansible joint connection limits considerably the absorption of lateral and misalignment effects. In addition also, many of the prior art devices do not afford means for preventing the infiltration of erosive and corrosive fluids between the sleeve or cartridge and the expansible element. Packing the sleeve at one or both ends to prevent this infiltration is not particularly satisfactory because of limiting the absorption of angular and misalignment effects in the flexible joint.

In the present invention, the sleeve element is attached to the piping system at one end, and the infiltration of erosive or corrosive fluids between the sleeve and expansible element is prevented by a floating ring seal located near the opposite end of the sleeve and the passage about this end of the sleeve and the ring of a fluid injected from near the fixed end of the sleeve under a greater pressure than that of the materials being passed through the piping system. The floating ring seal is a washer-like element placed over the free end of the sleeve and projects into an annular groove or pocket in the unattached end of the flexible joint. The ring or washer is usually located at some small distance from the free end of the sleeve and has sufficient annular clearance from the sleeve to permit free movement of the sleeve under longitudinal misalignment and lateral displacements. The injected fluid escapes into the pipe-line through the clearance provided around the ring.

In some cases, the erosive or corrosive material being transmitted may be exterior to the bellows element and some other material may be passing through the interior of the bellows element. In these cases, the liner, now more properly termed a shield, is placed outside the bellows element and thus protects the expansible element from the infiltration of the injurious materials. When protection of the expansible element is necessary on the two sides, both liner and shield elements may be employed. In both cases, however, an inert fluid is injected between the bellows element and the liner under a high pressure to prevent the infiltration of the erosive or corrosive material into the expansible element.

In order that the invention may be more clearly understood, illustration of its incorporation in the piping installation of a catalytic cracking unit employing fluidized solids will be presented.

Figure 2:
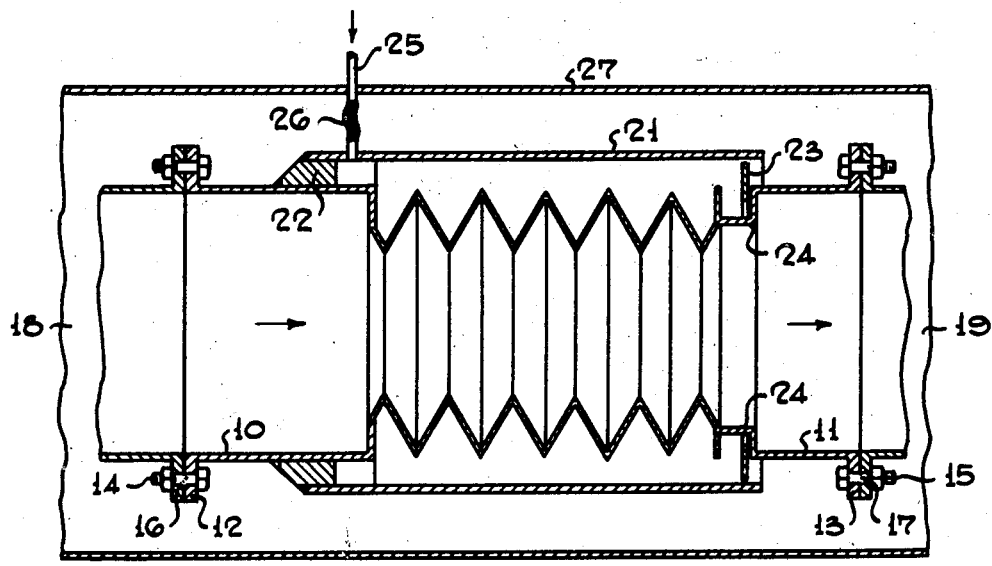
Figure 3:
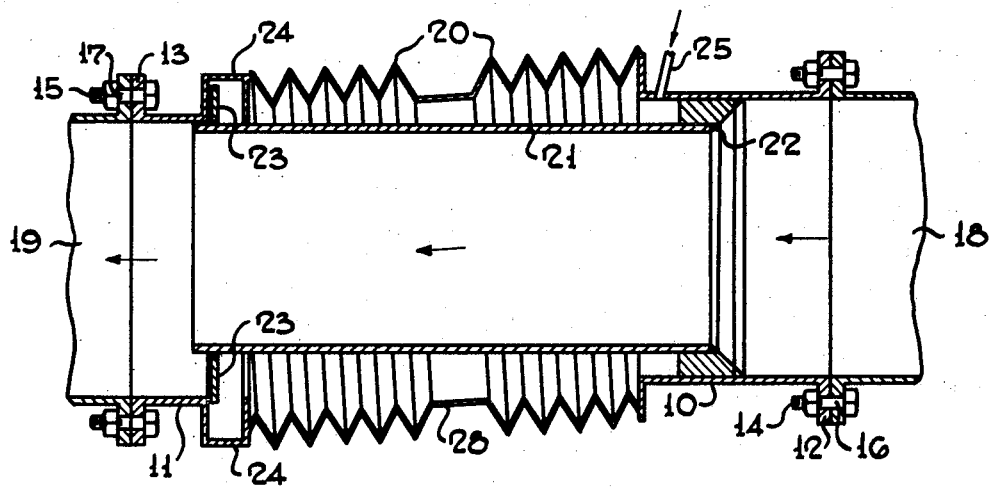
Figure 4:
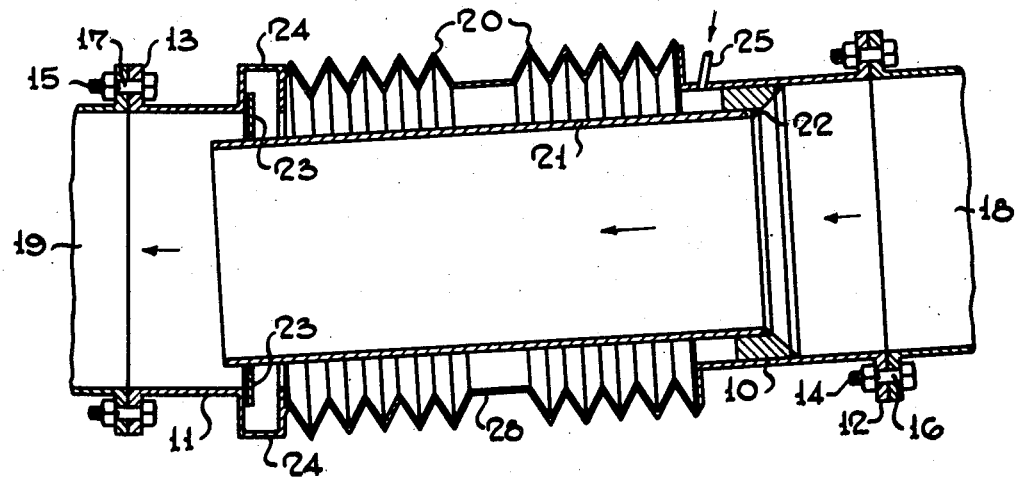

Figure 1 presents diagrammatically a simple form of an embodiment of the invention. Figure 2 shows another embodiment with the liner element exterior to the expansion element. Figure 3 shows an embodiment under lateral displacement conditions. Figure 4 shows another embodiment of the invention under misalignment conditions. In the various drawings, the same numerals refer to corresponding parts.

In Figures 1 and 2, two aligned pipe 10 and 11 are shown as having flanged end pieces 12 and 13 for connection by means of bolts 14 and 15 fitted through bolt holes 16 and 17 into ends 18 and 19 of the piping system. Between the pipes 10 and 11 is the bellows element 20 and connected thereto preferably by welding. In these drawings only one bellows element respectively is shown as connecting the pipes 10 and 11. In many cases however two or more bellows elements are employed—the number being determined by the conditions of the installation especially as to the probable extent of the dimensional changes and the probable occurrence of lateral or misalignment movement at the expansion joint. In Figures 3 and 4 two bellows elements are shown as means for adequately providing for the lateral and misalignment displacements at the joint.

Encased and wholly surrounded by the bellows element 20 and the end portions of the pipes 10 and 11 is the liner or sleeve element 21 having a diameter sufficiently different so as to allow for lateral movement. The sleeve element 21 is attached at the end of 22 to pipe 10. The other end of the sleeve 21 is unattached. At this end a washer-like element or floating ring 23 as it is commonly termed, is placed over the sleeve. The ring 23 has a slight annular clearance from the sleeve. The ring 23 also projects into a pocket 24 that is constructed in the pipe 11 near to the connection of the bellows element to the pipe 11. Near the fixed end of the sleeve is an inlet jet 25 through which the inert fluid, usually steam, is passed into the space between the bellows and the liner or shield element at a slightly higher pressure than that upon the material passing through or around the liner. The fluid thus injected passes through the clearance between the sleeve element 21 the floating ring 23 and around the ring 23 in the pocket 24. In Figure 2, the sleeve 21 is outside of the bellows element 20 and the fluid inlet 25 is connected by flexible tubing 26 to the outside casing 27.

In Figure 3 illustrating lateral displacement two bellows elements 20 are shown as being connected by an annular member 28. In Figure 4 illustrating misalignment displacement, two bellows elements 20 again are shown as being connected by an annular member 28. In both cases as shown in Figures 3 and 4, the bellows element moves about the liner 21.

Such type expansion joint has been found particularly advantageous in a line carrying vapor and catalyst material at a temperature between 1000 and 1100° F. and a pressure of 25 p. s. i. as commonly employed in petroleum refinery units involved in catalytic cracking processings. The joint in this case may be internally insulated with a "cartridge" sleeve assembly packed with asbestos. Such a sleeve has been found to reduce operating wall temperatures to approximately 500° F. thus permitting the use of less expensive steels. The body of the joint may be made of carbon steel while the bellows may be of electrically welded stainless steel.

What is claimed is:

1. An expansion joint, comprising a bellows element, pipe elements secured in fluidtight relation to each end of said bellows and spaced thereby, a tubular sleeve, substantially longer than the bellows element, secured at one end in fluidtight relation to a pipe element, said sleeve extending longitudinally of the bellows, in annularly spaced relation thereto, into annularly spaced, reciprocal relation to the other pipe element, a partial seal between said sleeve and pipe element, and pipe means for continuously introducing a fluid into the annular space between said bellows and sleeve under a pressure sufficient continuously to pass a portion of said fluid through said partial seal.

2. An expansion joint according to claim 1 in which said sleeve is disposed interiorly of said expansible element.

3. An expansion joint according to claim 1 in which said sleeve is disposed exteriorly of said expansible element.

4. In an expansion joint according to claim 1, a partial seal comprising an annular recess in said pipe element reciprocally related to said sleeve, an annular seal member on the sleeve in closely fitted edgewise reciprocal relation thereto, said seal member extending into the pipe element recess in annularly spaced relation to the bottom wall thereof, and slideable on said sleeve, under pressure of the introduced fluid, into surface contact with a side wall of said recess.

ERNEST COPELAND.

REFERENCES CITED

The following references are of record in the file of this patent:

UNITED STATES PATENTS

| Number | Name | Date |
|---|---|---|
| 1,702,066 | Valentine | Feb. 12, 1929 |
| 1,821,274 | Plummer | Sept. 1, 1931 |
| 2,207,146 | Fentress | July 9, 1940 |
| 2,337,038 | Fentress | Dec. 21, 1943 |